Feb. 6, 1951        W. L. SORENSON        2,540,495
TIE MEANS FOR CONNECTING MEMBERS
TOGETHER AND TO A SUPPORT
Filed Jan. 24, 1946
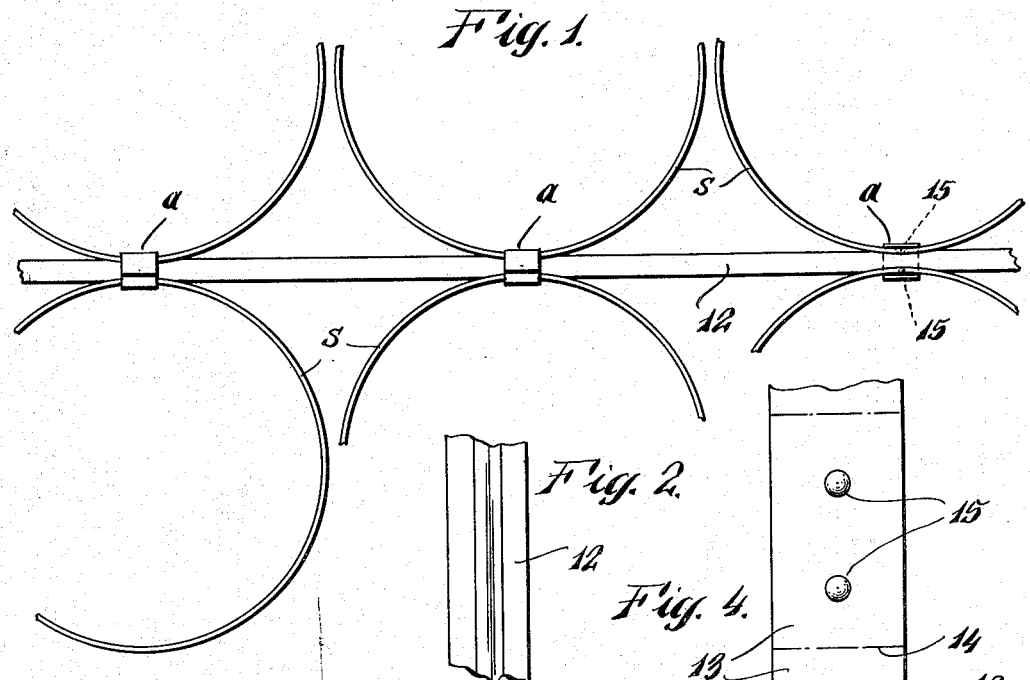
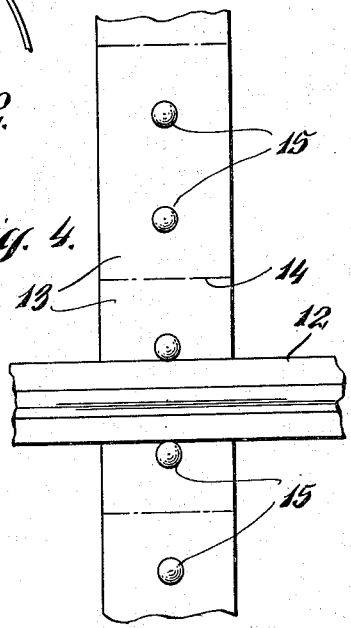
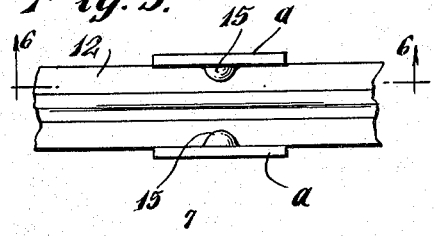
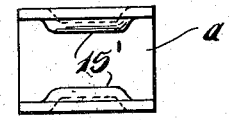
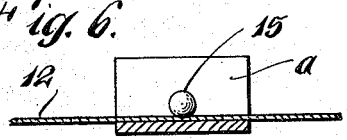
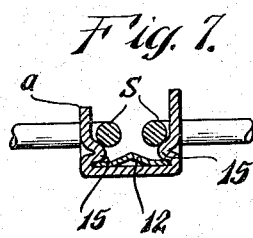
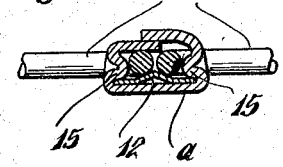
INVENTOR.
W. L. Sorenson
BY John O. Seifert
ATTORNEY.

Patented Feb. 6, 1951

2,540,495

UNITED STATES PATENT OFFICE 2,540,495

TIE MEANS FOR CONNECTING MEMBERS TOGETHER AND TO A SUPPORT

Wendell L. Sorenson, Great Neck, N. Y.

Application January 24, 1946, Serial No. 643,074

5 Claims. (Cl. 5—267)

This invention relates to means for connecting together members or bodies and supporting the connected members or bodies, and while the invention is applicable for various uses it is particularly adapted for use in tying or connecting together the springs of a spring unit.

In spring units of this character a series of coiled springs are assembled in rows. The springs of the spring unit extend in parallel axial relation to each other. The application of weight or pressure to the ends of the springs displaces the springs laterally out of axial position with the result that the springs will not support the weight evenly. To prevent lateral displacement of the springs it has been contemplated to provide tie members in the form of wire or rods disposed between adjacent springs of rows of springs. The end coils or convolutions of adjacent springs of rows of springs are connected together and to such tie members by a clip bent around juxtaposed portions of the end coils or convolutions of the springs and the tie members. However, in practice it has been found that connecting the end coils of the springs to the tie member by such means will not prevent lateral displacement of the springs since a force applied to the springs tending to displace the ends of the springs laterally causes the clip connecting the end coils of the springs to the tie member to move with the end of the spring longitudinally of the tie member and the clip operates to retain the springs in such laterally displaced position.

It is the object of the invention to provide in spring units improved tie means and means to connect the end coils or convolutions of opposite springs of adjacent rows of springs to the tie means and prevent lateral displacement of the springs of the spring unit.

It is another object of the invention to provide improved means for tying or connecting together the end coils or convolutions of the springs of a spring unit, comprising a tie member substantially of flat and edgewise stiff strip material, and metal clips predeterminedly spaced along the strip to correspond with the spacing of the springs of a row or rows of springs and formed from blanks substantially of rectangular form disposed transversely of and bent substantially to channel shape relative to and with the leg connecting portion thereof juxtaposed to a surface of the tie member and the legs extending substantially at a right angle to the tie member, and said clip blanks having portions offset therefrom in the same direction adapted when bent to channel shape to clamp and secure the clips to opposite marginal portions of the tie member, and said clips adapted to connect together the springs of adjacent rows of springs and to the tie members by engaging portions of the end coils of opposite springs of rows of springs with and bending the legs of the clip thereover, said bending of the legs of the clip functioning to more firmly clamp and secure the clip to the tie member.

In the drawing accompanying and forming a part of this application there is shown my improved means for connecting together and to a tie member the springs of rows of springs of a spring unit, the spring connecting and tie means being shown in detail substantially of double size, wherein Figure 1 is a plan view of a portion of the springs of two rows of springs of a spring unit and showing my improved tie means connecting together and to a tie member the springs of a spring unit.

Figure 2 is a plan view of a portion of a strip of material constituting the tie members.

Figure 3 is a cross sectional view of the tie member shown in Figure 2.

Figure 4 is a plan view of a strip of metal from which are formed the clips to be secured in spaced relation to a tie member and adapted to connect together and to a tie member the springs of a spring unit.

Figure 5 is a plan view showing a clip secured to a tie member prior to connecting a pair of springs to the tie member.

Figure 6 is a sectional view taken on the line 6—6 of Figure 5.

Figure 7 is a cross sectional view of a clip and a tie member showing the manner of clamping and securing the clip to the tie member and showing the ends of two springs in position to be clamped to the tie member.

Figure 8 is a cross sectional view showing springs of a spring unit secured together and to a tie member by a clip.

Figure 9 is a plan view of a clip showing a modified arrangement of the offset portions or nibs for clamping and securing the clips to a tie member; and Figure 10 is a longitudinal sectional view of the clip shown in Figure 9.

In carrying out the invention there is provided a tie member in the form of a strand or strip of material, preferably metal, and shown as a strip of edgewise stiff, flat material having a reinforcing rib offset laterally and extending longitudinally of the strip, as shown at 12 in Figures 2 and 3.

Clips $a$ of channel shape with the legs thereof extending substantially at a right angle to the leg connecting portion for connecting together members or bodies, such as the springs s of a spring unit, and to the tie member, are secured in predetermined spaced relation along the tie member 12. These clips a are formed from blanks 13 of predetermined length and are separated, as on a weakened transverse line 14, from a strip of relatively stiff though pliable metal. The clip forming blanks are formed to channel shape relative to the tie member forming strip 12. For this purpose the strip 12 is juxtaposed to a face of the end blank of the strip of clip forming blanks to extend transversely thereof. In this position of the strip 12 said clip forming blank is separated from the strip 13 on the weakened transverse portion 14 and the opposite end portions are bent to channel shape to extend substantially at right angles to the intermediate portion of the blank to constitute the side walls or legs of the clip and the clip secured to the tie member 12, which is effected by clamping the opposite marginal portions of the strip 12 between the legs and leg connecting portion of the clip as the end portions of the blank are bent to channel shape. To more securely clamp and secure the clips to the strip or tie member 12 the clip forming blanks have portions in the form of nibs 15 offset laterally therefrom in the same direction. These offset portions are spaced apart a distance slightly greater than the width of the strip 12 and one end portion of the clip forming blank outwardly from one nib is of less length than the other end portion outwardly from the other nib, whereby when said end portions of the clip forming blank are bent relative to the intermediate portion one leg of the clip will be of greater length than the other leg, as shown in Figure 7. These offset portions 15 as the end portions of a clip blank are bent to right angle form will firmly clamp the marginal portions of the tie member 12 to the connecting portion of the clip.

The clips a are spaced along the strip 12 distances equal to the spacing of the springs of the rows of springs of the spring unit. To secure the springs together and to the tie member 12 the tie member is positioned between the springs of two rows of springs which are to be connected together and to the tie member. The end coils or convolutions of springs at opposite sides of a clip secured to the tie member or strip 12 are then engaged over and within the legs of the clip connecting together said convolutions of the springs, as shown in Figure 7, and thereby connecting the springs together and to the supporting or tie member 12.

To secure the springs to the clip and to the tie member the legs of the clip are bent inwardly over the portions of the springs engaged within the clip legs, the short leg of the clip being first bent over the one spring portion and in successive sequence the longer leg of the clip is bent over the other spring portion in overlapping relation to the shorter clip leg, as shown in Figure 8. Due to arranging the tie member or strip 12 with the intermediate longitudinal reinforcing rib as the clip legs are bent over the portions of the springs engaged within the clip legs this rib will direct said portions of the springs laterally toward each other and as the clip legs are bent inwardly said portions of the springs will be forced against the offset or nib portions 15 of the clip and thus forcibly impinge said offset portions against the tie member and more firmly clamp and secure the clip to the tie member. By so connecting the springs together and to the tie member any force applied to the springs tending to move and displace the springs laterally of the tie member will be resisted by the clips and will also be taken up edgewise by the tie member without any possibility of bending and distorting the tie member which would permit of lateral displacement of the springs. Should any force be applied to the springs tending to move or displace the springs laterally in a direction longitudinally of the tie member such force will be taken up longitudinally of the tie member through the clips due to the securing of the clips to the tie member and prevent movement of the clip longitudinally of the tie member.

The portions or nibs offset from the material of the clips as described and shown in Figures 4 to 8 are of circular form and slightly tapered. In Figures 9 and 10 a modified arrangement of said offset portions or nibs 15 is shown. The nibs are elongated in a direction transversely of the clips and the opposite side walls converge or taper at a slight angle toward each other, as shown at 15' in Figures 9 and 10. By this arrangement of the offset portions or nibs the clips will be clamped and secured to a portion of greater length of the tie member 12 than the form of nib shown in Figures 1 to 8, inclusive, and thus more securely lock the clips to the tie member.

Having described my invention, I claim:

1. In tie means for connecting together the springs of a spring unit, a strip of material adapted to be disposed relative to adjacent springs of a spring unit, and clips for connecting the springs together and to said strip, each clip comprising a channel member engaged upon the strip with the leg connecting portion adjacent a face of the strip and each leg of the clip having a nib to engage the opposite face of the strip and impinge the strip against the leg connecting portion of the clip and securing the clip to the strip.

2. In tie means for connecting together springs of a spring unit, a strip of edgewise stiff material adapted to be disposed relative to the springs of a spring unit, and channel shaped clips formed of flat and rigid though pliable material engaged upon the strip, the leg connecting portion of each clip being contiguous to a face of the strip, each of the legs of a clip adjacent the juncture thereof with the leg connecting portion of the clip having a portion thereof offset inwardly and impinged against the strip in opposed relation to the leg connecting portion of the clip and securing the clip to the strip.

3. Tie means for connecting together springs of a spring unit as claimed in claim 2, wherein the strip is arranged with a rib offset laterally from and intermediate the side edges of the strip, and said rib when the clips are engaged with the strip disposed between the offset portions of the clip legs, and portions of the legs above the offset portions adapted to be extended inwardly over and in spaced relation to the strip.

4. In tie means for connecting the springs of a spring unit, a strip of edgewise stiff material adapted to be disposed relative to adjacent rows of springs of the spring unit, and clips spaced along the strip for connecting opposite springs of the rows of springs together and to said strip, each clip comprising a blank of relatively rigid though pliable flat material having nibs offset therefrom in the same direction and spaced apart a distance slightly greater than the width of the strip, the strip being disposed transversely of the blank between the nibs, and the end portions of the blank extended perpendicular to the strip and the nibs thereof clamping opposite marginal portions of the strip between said nibs and an intermediate portion of the clip and securing the clips to the strip, and the extremities of said end portions adapted to be extended over and in spaced relation to the strip.

5. Tie means for connecting together springs of a spring unit as claimed in claim 2, wherein one leg of the clips is longer than the other leg, whereby the longer leg overlaps the shorter leg when the legs are extended over and in spaced relation to the strip.

WENDELL L. SORENSON.

REFERENCES CITED

The following references are of record in the file of this patent:

UNITED STATES PATENTS

| Number | Name | Date |
| --- | --- | --- |
| 846,085 | Bodenstein | Mar. 5, 1907 |
| 970,157 | Young | Sept. 13, 1910 |
| 1,270,238 | Falls | June 18, 1918 |
| 1,834,789 | Lodge | Dec. 1, 1931 |
| 2,170,618 | Roeske | Aug. 22, 1939 |
| 2,247,490 | Greenhill | July 1, 1941 |
| 2,295,278 | Winders | Sept. 8, 1942 |